July 1, 1958
F. R. BOICE
2,840,879
CLAMPING TOOL FOR CLAMPING TOGETHER
CYLINDRICAL CONTAINERS
Filed Nov. 7, 1957
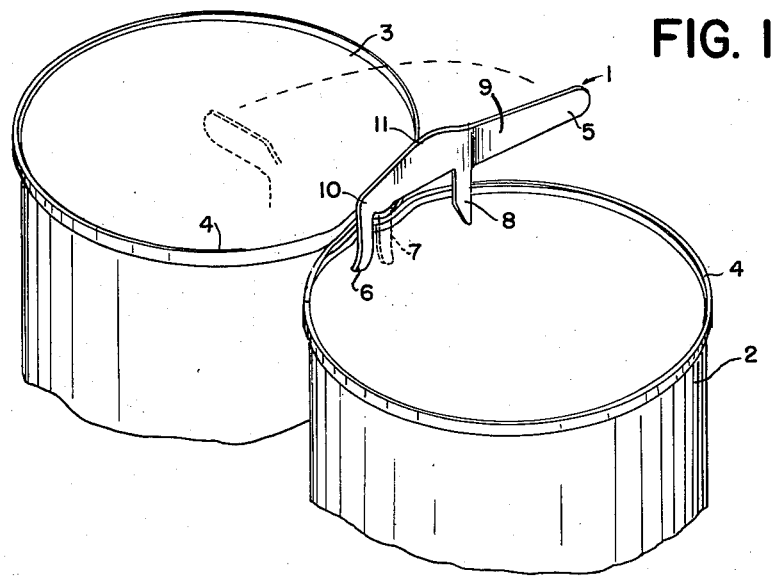
FIG. 1
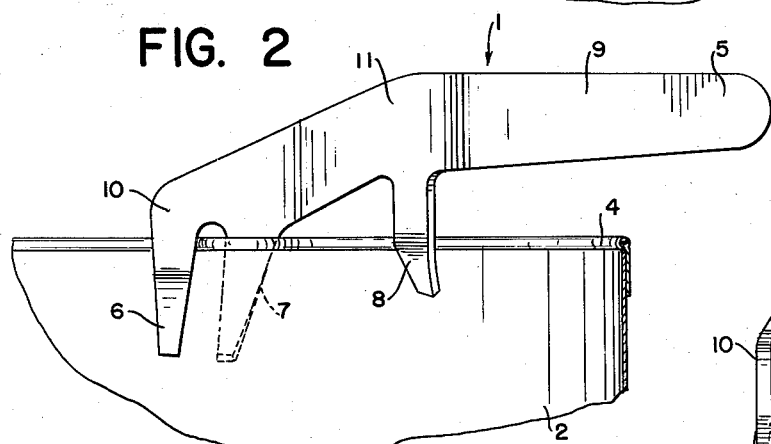
FIG. 2
FIG. 3
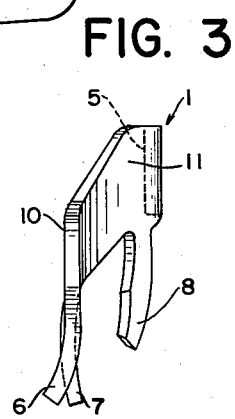
FIG. 4
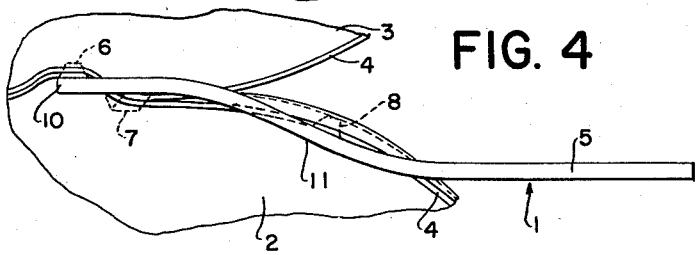
INVENTOR.
FRED RICHARD BOICE
BY Pennie, Edmonds,
Morton, Barrows & Taylor
ATTORNEYS

United States Patent Office 2,840,879
Patented July 1, 1958

2,840,879

CLAMPING TOOL FOR CLAMPING TOGETHER CYLINDRICAL CONTAINERS

Fred Richard Boice, New Monmouth, N. J.

Application November 7, 1957, Serial No. 695,026

4 Claims. (Cl. 24—259)

My invention relates generally to a clamping tool for clamping together cylindrical containers and more particularly to a tool to prevent adjacent cylindrical containers, such as ice cream cartons, from rotating relative to one another.

A difficulty exists in the use of present day ice cream cartons in that when they are placed in the freeze box of soda fountains adjacent one another, they rotate and move in relation to one another, when a scoop is inserted into the hard ice cream. This makes the removal of the ice cream difficult and requires holding the carton with the other hand while scooping. This is particularly true when the ice cream is in a very hard state. I propose to overcome this difficulty by providing for an inexpensive tool which may easily clamp adjacent cylindrical ice cream cartons together so that they will not rotate or otherwise move in relation to one another.

Broadly, I provide for an S-shaped clamping tool which has thereon a plurality of depending fingers. Two of the fingers are at the end of the S-shaped member and the distance between them is such that they may engage opposite sides of the beaded end portions of the adjacent cylindrical containers. A third finger is placed near the middle of the S-shaped member and is adapted to engage a side of one of the containers. The fingers themselves are bent at their ends so that they may forcibly engage the sides of the containers.

Referring to the drawings in which a preferred embodiment of my invention is illustrated, Fig. 1 is a perspective view showing my novel clamping tool positioned on adjacent cylindrical containers;

Fig. 2 is a side view showing the clamping tool engaging a container;

Fig. 3 is an end view of the clamping tool, and

Fig. 4 is a plan view of Fig. 2.

Referring to the drawings in greater detail and in particular to Fig. 1, 1 denotes generally a clamping tool constructed according to my invention applied to adjacent cylindrical containers 2 and 3. Cylindrical containers 2 and 3 are, in this instance, ice cream cartons, which are usually constructed of cardboard having a light metal beaded portion 4 on the end thereof to prevent the cardboard from fraying and to add strength to the container.

My novel clamping tool comprises an S-shaped member 5, as shown in Fig. 4, from which depend fingers 6, 7 and 8, as shown in Fig. 2. Fingers 6, 7 and 8 are alternately curved at their ends as shown in Fig. 3 in order to forcibly engage the sides of the cardboard containers when they are brought into contact therewith.

The S-shaped member 5 itself comprises a handle portion 9 extending above an end portion 10 both of which are joined by middle portion 11. The handle portion 9 extends above the end portion 10 in order that the handle may be easily grasped by the hand when the tool is in engagement with the sides of the container and so that the hand will not come in contact with the contents of the containers. Fingers 6 and 7 depend from end portion 10, while finger 8 depends from middle portion 11.

The spacing between fingers 6 and 7 is such that fingers 6 and 7 may be slipped over the ends of the side walls of adjacent containers. That is, they must be at least as wide as twice the width of the beaded portion 4. Depending finger 8 is spaced further from fingers 6 and 7 so that it may engage the same sidewall of the same containers as finger 6.

The engagement of the clamping tool to effect the locking together of the containers is simple. The tool is initially brought into contact with the adjacent containers 2 and 3 by placing the fingers 6 and 7 over the beaded end portions 4 of both containers at their point of contact as shown in the dotted portion of Fig. 1. The tool is then moved towards the common line of tangency between the containers until finger 8 engages the same side of a container as finger 6. When this is done, the handle is depressed so that finger 8 firmly engages the side wall of container 2 and locks the clamping tool in place. Since the side walls of the container are of light construction, they will be readily bent as shown in Fig. 4 so that they are crimped together. It is obvious that this crimping will lock the containers together so that they are no longer free to rotate even when a scoop is inserted into the hard contents of the containers. The curved ends of depending fingers 6, 7 and 8 further serve to lock the tool in place since they bend into the side walls of the containers.

The tool can be constructed of any material, although I find that a metal such as aluminum is preferable since it presents a clean appearance and affords the necessary strength.

Having thus described certain embodiments of this invention, it should be evident to those skilled in the art that many changes may be made therein without departing from its spirit or scope as defined by the appended claims.

I claim:

1. A clamping tool for clamping together the outer ends of the side walls of adjacent cylindrical containers comprising an S-shaped base, a plurality of fingers depending from said base, said fingers being so spaced as to alternately engage the side walls of a single container and two of said plurality of fingers being so spaced to engage opposite sides of the walls of said adjacent containers when said tool is brought into engagement with said containers.

2. A clamping tool for clamping adjacent cylindrical containers against relative rotation comprising a base member, said base member being curved in one direction at an outer portion and curved in an opposite direction at its middle portion, and said member having a plurality of depending fingers attached to said outer and middle portions, said fingers being so spaced from one another to alternately engage the side wall of one container when brought into contact with said containers.

3. A clamping tool according to claim 2 having three depending fingers, two of said fingers depending from said outer portion and being so spaced from one another to engage opposite sides of adjacent containers at their point of tangency when brought into contact with said containers and the remaining finger depending from said middle portion and adapted to engage a side wall of a single container.

4. A clamping tool according to claim 3 wherein the outer ends of said fingers are curved alternately.

References Cited in the file of this patent

UNITED STATES PATENTS

| | | |
|---|---|---|
| 384,034 | Hack | June 5, 1888 |
| 2,679,082 | Himberger | May 25, 1954 |